United States Patent [19]

Tokio et al.

[11] Patent Number: 4,857,782
[45] Date of Patent: Aug. 15, 1989

[54] STEP MOTOR

[75] Inventors: Uetsuhara Tokio, Urawa; Iwasaki Hiroji, Kyoto, both of Japan

[73] Assignees: Mitsubishi Mining & Cement Co. Ltd., Tokyo; Iwasaki Electronics Co. Ltd., Kyoto, both of Japan

[21] Appl. No.: 99,474

[22] Filed: Sep. 22, 1987

Related U.S. Application Data

[63] Continuation-in-part of Ser. No. 823,499, Jan. 21, 1986, abandoned.

[30] Foreign Application Priority Data

Jun. 5, 1984 [JP] Japan .................... 59-113817
Apr. 2, 1985 [JP] Japan .................... 60-69801

[51] Int. Cl.$^4$ ............................ H02K 41/02
[52] U.S. Cl. ............................ 310/12; 310/49 R; 318/135
[58] Field of Search ............... 310/12, 49 R; 318/135

[56] References Cited

U.S. PATENT DOCUMENTS 3,786,287 1/1974 Stein ...................... 310/46
3,999,107 12/1976 Reuting .................. 318/135

FOREIGN PATENT DOCUMENTS 2028598 3/1980 United Kingdom .

Primary Examiner—Patrick R. Salce
Assistant Examiner—Judson H. Jones
Attorney, Agent, or Firm—Bierman and Muserlian

[57] ABSTRACT

A step motor comprising magnetic stationary members (1,11) containing a plurality of series of magnetic poles (1a, 1b, ... 11a, 11b, ...) arranged at a predetermined regular pitch; a magnetic movable member (4) containing a plurality of series of magnetic poles (4a, 4b, ... 41a, 41b ...) arranged at a predetermined regular pitch different from the magnetic poles series (1a, 1b, ... 11a, 11b, ...), each magnetic pole series (4a, 4b, ..., 41a, 41b,) having a magnetic surface opposing the magnetic surface of each of the pole series (1a, 1b, ..., 11a, 11b, ...) through a gap; electric coils (2a, 2b ...) wound so as to energize the magnetic pole series and generating a first flux; a permanent magnet (5) containing a first magnetic pole face fixed to either the magnetic stationary member (1,11) or the magnetic movable member (4) and a second magnetic pole face which is arranged opposite to the magnetic stationary member (1,11) or the magnetic movable meber (4) through the gap and generating a second flux; and means (6,7) for mechanically displacing the magnetic movable member (4) with respect to the magnetic stationary members (1,11), characterized in that said electric coils (2a,2b, ... ) are so wound as to energize one magnetic pole, which belongs to one of groups each which includes a predetermined number of poles classified from the magnetic poles (1a, 1b, ... 11a, 11b, ... 4a,4b, ... 41a, 41b, ... ), generate the first flux in the same direction of the second flux, energize the other magnetic poles and generate the first flux in the counter direction of the second flux and energize the all electric coils (2a, 2b, ... ) simultaneously and the permanent magnet (5) is so arranged that the first flux generated by the coils do not flow through the permanent magnet (5).

1 Claim, 7 Drawing Sheets

STEP MOTOR

PRIOR APPLICATION

This application is a continuation-in-part of our copending application ser. No. 823,499 filed Jan. 21, 1986, now abandoned.

TECHNICAL FIELD

The present invention relates to a step motor which is adapted to maintain various mechanical stable states, to freely control for switching between such mechanical stable positions in an electric manner, or to a positioning mechanism such as valve rod, XY plotter or the like.

PRIOR ART

Conventionally, various step motors such as a variable reluctance type, a permanent magnet rotor type, a hybrid permanent magnet type have been developed according to various operation principles. Particularly, the hybrid permanent magnet type (hereinafter, referred to simply "HPM") has been commonly used.

Figure 5:
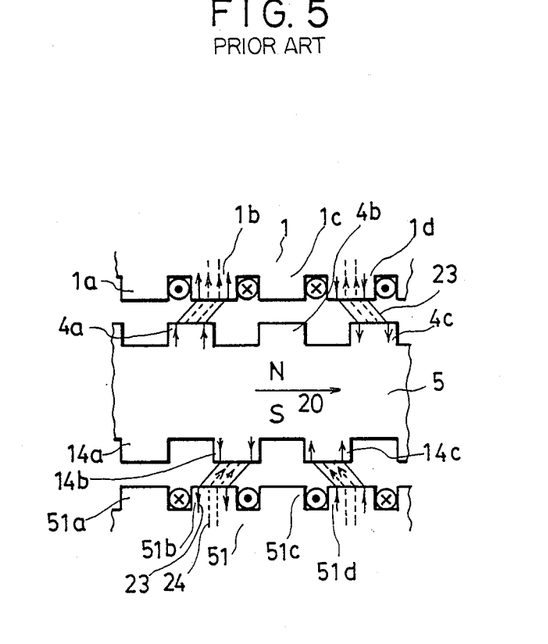
FIG. 5 is a schematic illustration showing a conventional HPM type step motor in a linear motor style.

First of all, referring to FIG. 5, a conventional HPM type step motor in a linear motor style will be described. Magnetic stationary members 1 and 51 are magnetically and mechanically connected to each other through means not shown. A series of magnetic poles 1a, 1b, 1c, 1d ... is formed in the magnetic stationary member 1 and another series of magnetic poles 51a, 51b, 51c, 51d, ... is also formed in the magnetic stationary member 51, respectively. The stationary members 1 and 51 are energized as an energizing coil, not shown, is applied with voltage. The series of magnetic poles 4a, 4b, 4c, ... and the series of magnetic poles 14a, 14b, 14c, ... are arranged at the two magnetic poles of a permanent magnet 5.

Under the condition that the arrangement between the stationary magnetic pole series 1a, ... and series 51a, ... Of the stationary members 1 and 51 and the moveable magnetic pole series 4a, ... and series 14a, ... Of the movable members 4 and 14 are maintained as shown in FIG. 7, the stationary pole series 1b, 1d, ... and the movable pole series 51b, 51d, ... are energized by applying voltage to the energizing coil, not shown. The magnetic flux 23 represented by the solid line arrow shown in the drawing is generated. On the other hand, the magnetic flux 24 represented by the dotted line arrow is generated by the permanent magnet 5 and thus the movable unit of the magnetic movable members 4 and 14 and the permanent magnet 5 are subjected to the urging force and the direction represented by the arrow 20 owing to interaction between these magnetic fluxes. According to this force, the movable unit is moved ¼ pitch of one tooth of the magnetic pole and then maintained at the stable position where the movable unit is not subjected to the urging force.

Succeedingly, as the stationary pole series 1a, 1c, ... and 51a, 51c, ... are energized, the movable unit is also moved towards and held at the succeeding stable position corresponding the energizing direction in the same manner as the above.

Figure 6A:
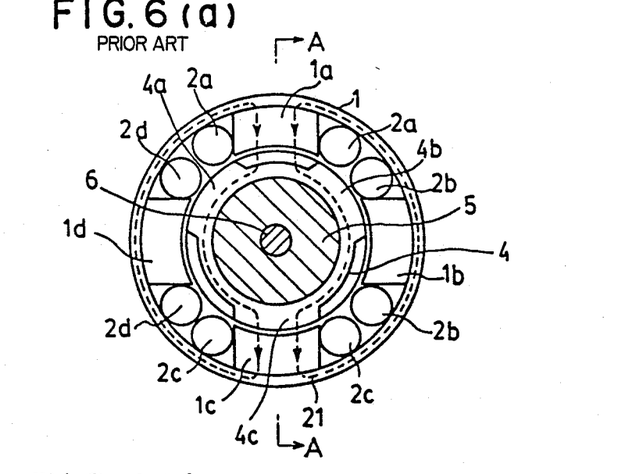
FIG. 6a and 6b are a schematic illustration showing a conventional HPM type step motor in a rotary motor style.
Figure 6B:
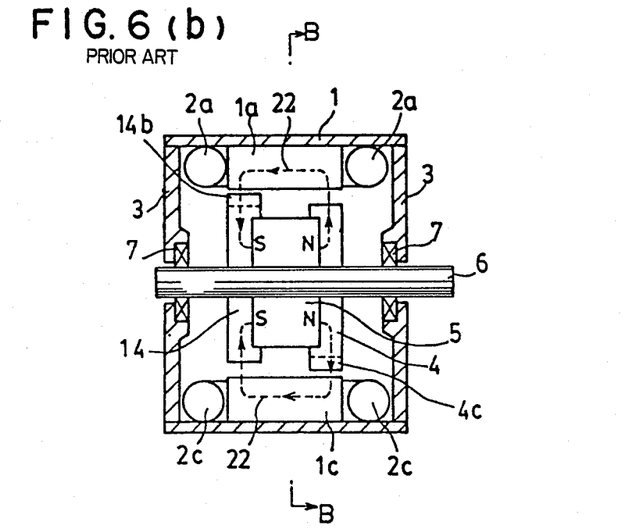

An operational principle of a conventional rotary type HPM step motor will be explained in conjunction with FIG. 8(a) and 8(b).

FIG. 6(a) is a cross-sectional view taken along the line B—B in FIG. 6(b) and FIG. 6(b) is a vertical sectional view taken along the line A—A in FIG. 6(a), respectively.

A series of magnetic poles 1a, 1b, 1c, 1d is arranged at the predetermined regular pitch on the internal surface of a cylindrical magnetic stationary member 1. The poles 1a, 1b, 1c, 1d are respectively provided with electric coils 2a, 2b, 2c, 2d for energizing them. The magnetic stationary member 1 is supported by a bracket 3 made of non-magnetic material. The bracket 3 contains a shaft 6 and a bearing 7 so as to pivotably support a rotary unit consisting of magnetic movable members 4 and 14 and a permanent magnet 5. The magnetic movable members 4 and 14 are tightly fixed to both poles of the permanent magnet 5. Magnetizing direction of the permanent magnet 5 is along the longitudinal axis of the shaft 6.

The magnetic movable member 4 is provided with a series of poles 4a, 4b, 4c, and the magnetic movable member 14 is also provided with a series of poles 14a, 14b, 14c. These pole series are arranged on the circumferential surface of each magnetic movable members 4 and 14 at predetermined regular pitch. This pitch is not equivalent to that of the pole series 1a, 1b, 1c, 1d of the magnetic stationary member 1. Further, the poles series 4a, 4b, 4c, 4d is shifted at a half pitch with respect to the pole series 1a, 14b, 14c, 14d.

Electric coils 2a, 2b, 2c, 2d are arranged in a multiple phase connection so that each opposite located pair with different phase at 180° for example, a pair of 2a and 2c and a pair of 2b and 2d, is energized at the same phase.

As the pair of coils 2a and 2c is energized and the pair of coils 2b and 2d is not energized, the magnetic flux 21 represented by the dotted line arrow in FIG. 6 (a) is generated in the magnetic poles 1a and 1c. Succeedingly, as the pair of coils 2b and 2d is energized and the pair of coils 2a and 2c is not, magnetic flux is also generated in the magnetic poles 1b and 1d. This is so called hetero-polar magnetic flux.

On the other hand, the permanent magnet 5 generates magnetic flux 22 in so called uni-polar shape as represented by the dotted line arrow in FIG. 8(b), so that this uni-polar magnetic flux 22 and the hetero-polar magnetic flux 21 are synthesized whenever either the coils pair 2a, 2b or the pair 2c, 2d is energized. This synthesized magnetic flux generates a torque between the movable members 4 and 14 and the stationary member 1 and thus the movable members 4 and 14 move and stay at a predetermined stable position.

As mentioned above, conventional HPM type step motor has been so designed that every magnetic pole 1a ..., 51a, ... arranged at the magnetic stationary members 1 and 51 is not energized while the energizing voltage is applied. In other words, one of phase numbers is only energized. As a result, this conventional step motor needs a relative great value of ampere turns for driving the movable member and a complicated constitution.

DESCRIPTION OF THE INVENTION

With these problems in mind, it is an object of the present invention to provide a high characteristics step motor which is improved by decreasing the value of ampere turns for driving, reducing the scale of structure and weight.

To resolve the above problems and achieve the above object, the step motor according to the present invention is characterized by the following aspects.

According to the present invention, the step motor comprises a movable unit made of magnetic material consisting of a first series of magnetic poles arranged at an even number pitch within a predetermined length; a stationary unit made of magnetic material consisting of a second series of at least three magnetic poles arranged at an odd number of pitch within the same length, the odd number being so determined that the above even number divided by this odd number results in non-integer, the above second magnetic pole series being oppositely arranged with the first magnetic pole series through a gap; electric coils for energizing the first or second magnetic pole series; and a permanent magnet fixed to the stationary unit or the movable unit so as to generate magnetic field in the above gap between the first and second magnetic pole series, whereby the movable unit is mechanically transferred with respect to the stationary unit through the gap.

According to one embodiment of the invention, the step motor is comprised of magnetic stationary members (1,11) containing a plurality of series of magnetic poles (1a, 1b, ... 11a, 11b, ...) arranged at a predetermined regular pitch; a magnetic movable member (4) containing a plurality of series of magnetic poles (4a, 4b, ... 41a, 41b, ...) arranged at a predetermined regular pitch different from the magnetic pole series (1a, 1b, ..., 11a, 11b, ...), each magnetic pole series (4a, 4b, ... 41a, 41b, ...) having a magnetic surface opposing the magnetic surface of each of the pole series (1a, 1b, ..., 11a, 11b, ...) through a gap; electric coils (2a, 2b, ...) wound so as to energize the magnet pole series and generating a first flux; a permanent magnet (5) containing a first magnetic pole face fixed to either the magnetic stationary member (1, 11) or the magnetic movable member (4) and a second magnetic pole face which is arranged opposite to the magnetic stationary member (1, 11) or the magnetic movable member (4) through the gap and generating a second flux and means (6,7) for mechanically displacing the magnetic movable member (4) with respect to the magnetic stationary members (1,11), characterized in that said electric coils (2a, 2b, ...) are so wound as to energize one magnetic pole, which belongs to one of groups each which includes a predetermined number of poles classified from the magnetic poles (1a, 1b, ..., 11a, 11b, ..., 4a, 4b, ..., 41a, 41b, ...), generate the first flux in the same direction of the second flux, energize the other magnetic poles and generate the first flux in the counter direction of the second flux and energize the all electric coils (2a, 2b, ... ) simultaneously and the permanent magnet (5) is so arranged that the first flux generated by the coils do not flow through the permanent magnet (5).

The present invention constituted as the above described provides following effects and advantages.

(1) In conventional step motor, the energizing coils are so applied with energizing voltage as to energize only one of phases. While in the step motor according to the present invention, all energizing coils are energized simultaneously.

Generally, torque for driving the movable member is generated in proportion to the square of the arithmetic sum of the magnetic flux generated by electric current and the magnetic flux generated by the permanent magnet, so that the step motor according to the present invention can easily generate torque several times as great as the conventional device when the input signal having the equivalent ampere turns is applied. Therefore, the step motor according to the present invention can be actuated by a fine current. In other words, this invention can provide the step motor with high sensitivity and remarkably save energy effects.

(2) Further, the present invention can provide the step motor in smaller size and light weight in comparison with the conventional device capable of generating the equivalent torque. Thus, the present invention can be effectively utilized for a mechanical-electronics field in which a fine current generated by solar cell or dry cell is used as power source, an interface at the output side in computer control system, or the like.

(3) In a specific embodiment according to the present invention where the permanent magnet is disposed at the stationary member, the movable member can be simplified and toughened, further the such embodied step motor can be easily achieved in a water proof and dust proof structure. Accordingly, this type step motor is suitable for mass-production. Furthermore, since the inertia moment of the movable member is decreased, the movable member quickly starts to drive. It is also possible to apply a large scale permanent magnet to this step motor so that the motor characteristics can be extremely improved (4) Further, since the first flux generated by the coils do not flow through the permanent magnet, this invention can provide the step motor with high sensitive and remarkably save energy effects.

BRIEF DESCRIPTION OF THE DRAWING

FIGS. 4(a), (b) are schematic illustrations for explaining the fourth embodiment according to the present invention;

PREFERRED EMBODIMENT FOR EMBODYING THE PRESENT INVENTION

Figure 1A:
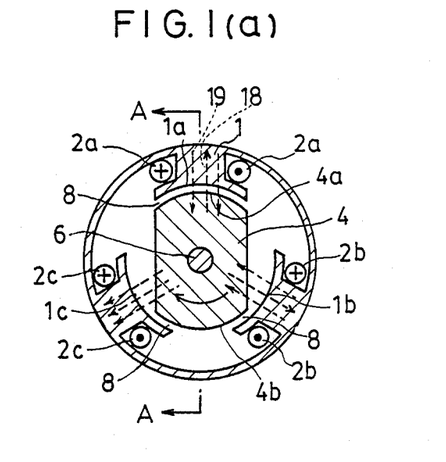
FIG. 1(a), (b), (c) (d) are schematic illustrations for explaining the third embodiment according to the present invention.

Hereinbelow, the present invention will be described in detail according to the embodiments with reference to the accompanying drawings. FIGS. 1(a), (b), (c), (d) are schematic illustrations showing a rotary electric motor which is a first embodiment according to the first present invention.

Figure 1B:
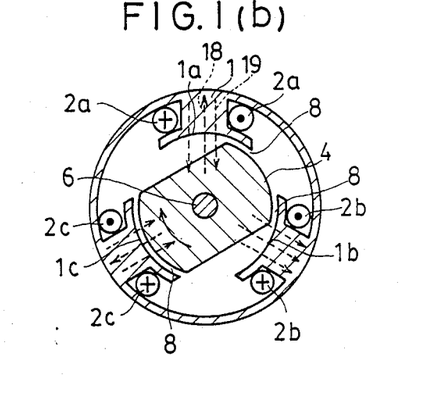
Figure 1C:
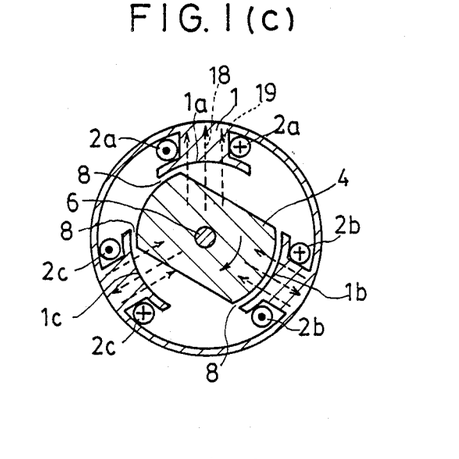
Figure 1D:
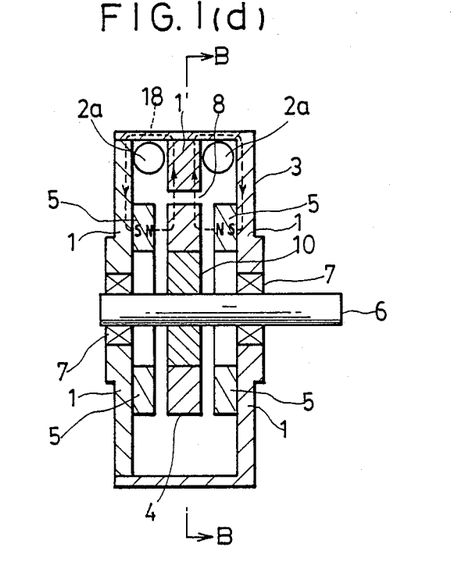

As shown in FIG. 1(d) which is a sectional view taken along the line A—A in FIG. 1(a), a permanent magnet 5, one magnetic face of which is fixed to a stationary member 1, applies the second magnetic flux 18 generated by the permanent magnet 5 to a gap 8 radially in the circumferential direction. A movable member 4 is rotatably supported by a shaft 6, a bearing 7 and a nonmagnetic member 10 with respect to the stationary member 1.

The movable member 4 made of a magnetic material contains two first magnetic poles 4a, 4b arranged at the regular interval by two pitches as a first pitch, and also the stationary member 1 made of a magnetic material contains three second magnetic poles 1a, 1b, 1c arranged at the same interval by three pitches as a second pitch. They are so arranged opposite each other through the gap 8 so as to allow the movable member 4 to displace mechanically with respect to the stationary member 1. That is, the first magnetic poles of the movable member 4 are shifted at 180° and the second magnetic poles of the stationary member 1 are shifted at 120°. The relation between the first pitch of the magnetic poles of the movable member 4 and the second pitch of the stationary member 1 is 3/2.

The stationary member 1 is provided with electric coils 2a, 2b, 2c for energizing the second magnetic poles 1a, 1b, 1c to generate the first flux 19. Further, although the permanent magent 5 is fixed to the stationary member 1, it may be fixed to the movable member 4.

Next, an operation of this embodiment will be explained.

When the movable member 4 and the stationary member 1 are maintained in the first mechanical stable position as shown in FIG. 1(a) where magnetic magnetic reluctance against the magnetomotive force by the permanent magnet 5 is the minimum value, the electric coils 2a, 2b, 2c are applied to electric current flowing in the direction as shown in the figure. The movable member 4 rotates clockwise in FIG. 1(a) and stops at the position shown in FIG. 1(b) which is the second mechanical stable position. After interception of the electric current, the movable member is maintained at this position.

Under the condition shown in FIG. 1(b), when the electric coils 2a, 2b, 2c are applied with electric current in the direction shown in FIG. 1(b), the movable member 4 also rotates and arrives at the position shown in FIG. 1(c); i.e., the third mechanical stable position.

Succeedingly, when the electric coils 2a, 2b, 2c are applied with electric current in the direction shown in FIG. 1(c), the movable member 4 rotates in the same manner as the above and returns to the first mechanical stable position shown in FIG. 1(a).

According to this manner, it can be reversibly controlled to shift the movable member 4 among the three mechanical stable positions by changing the polarity of electric pulse applied to the electric oils 2a, 2b, 2c. However, the case that even number of the first pitch of the movable member 4 divided by odd number of the second pitch of the stationary member 1 results in integer, is omitted. Further, odd number of the first pitch of the stationary member 1 should be three or more, so that one should be omitted from the odd numbers. For example, the case that the first pitch is six and the second pitch is three, is omitted since six divided by three results in integer. This is explained by the reason that if the above condition is established, the magnetic poles of the movable member and the stationary member are fallen in neutral state where forces are balanced and thus they are not driven at all. Also, it is needless to explain for that the present invention can not be established when the pitch number of the stationary member is one.

These facts will be valid in the following second embodiment.

Figure 2A:
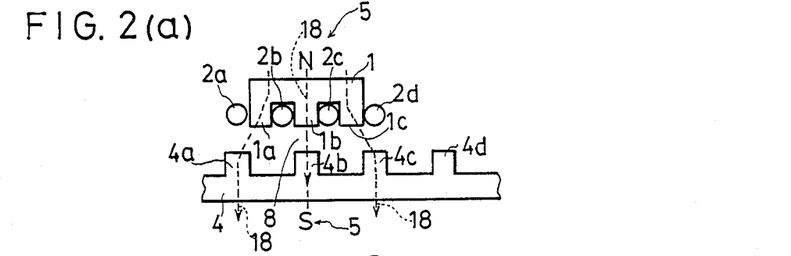
FIG. 2(a), (b), (c), (d) are schematic illustrations for explaining the embodiment according to the first present invention.

Referring to FIG. 2(a), (b), (c), (d), there is shown a linear motor wherein a second embodiment according to the present invention is embodied.

A movable member 4 made of a magnetic material contains a series of magnetic poles 4a, 4b, 4c, 4d, . . . arranged at a regular pitch in a linear formation as like as teeth-shape. A stationary member 1 contains three magnetic poles 1a, 1b, 1c arranged at ⅔ pitch of the above pitch of the movable member 4. This series of magnetic poles 1a, 1b, 1c faces to the series of poles 4a, 4b, 4c, 4d, . . . Of the movable member 4 through a gap 8. The movable member 4 can be mechanically moved with respect to the stationary member 1 in a linear parallel direction. The magnetic poles 1a, 1b, 1c of the stationary member 1 are further provided with electric oils 2a, 2b, 2c, 2d respectively so as to energize the magnetic poles 1a, 1b, 1c.

A permanent magnet, not shown in the drawing, is fixed to either the stationary member 1 or the movable member 4 so that direct current magnetic flux 18 is generated.

An operation of this embodiment will be explained as follows:

As shown in FIG. 2(a), the movable member 4 is located in a first mechanical stable position which is one of positions at which magnetic reluctance against the magnetomotive force generated by the permanent magnet is the minimum. Under this condition, when the electric coils 2a, 2b, 2c, 2d are applied with electric current flowing in the direction shown in FIG. 2(b), the first magnetic flux 19 generated by these coils 2a, 2b, 2c, 2d is cancelled by the second magnetic flux 18 generated by the permanent magnet at the magnetic poles 4a, 4b, on the other hand, these magnetic fluxes are synthesized at the magnetic pole 4c. As a result, the movable member 4 is shifted into the position shown in FIG. 2(b) and is stable with respect to the stationary member 1. Even when the electric current is intercepted, the second mechanical stable state shown in FIG. 2(b) is kept.

Figure 2B:
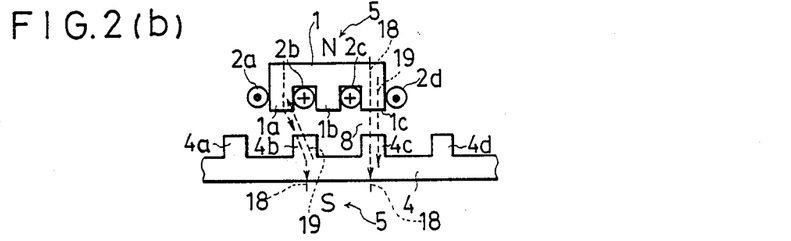
Figure 2C:
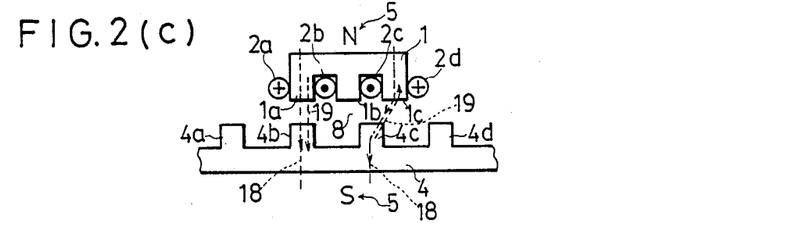
Figure 2D:
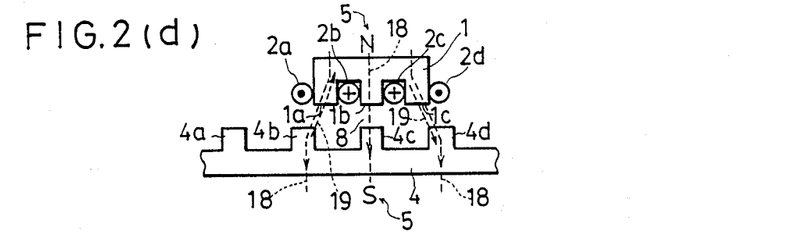

In the same manner as the above, the stationary member 1 is shifted from the second stable position shown in FIG. 2(b) to the third stable position shown in FIG. 2(c) by applying the electric current as shown in FIG. 2(c), and succeedingly shifted from the third stable position shown in FIG. 2(c) to the position shown in FIG. 2(d) corresponding to the first stable position shown in FIG. 2(a) by applying the electric current as shown in FIG. 2(d).

As a result, it can be reversibly controlled to shift or keep the movable member 4 among various mechanical stable positions by changing the polarity of the current or turning on/off the current applied to the electric coils 2a, 2b, 2c, 2d for energizing the stationary member 1.

It is needless to mention that the pitch numbers of the and second embodiment according to the present invention is not limited.

Figure 3:
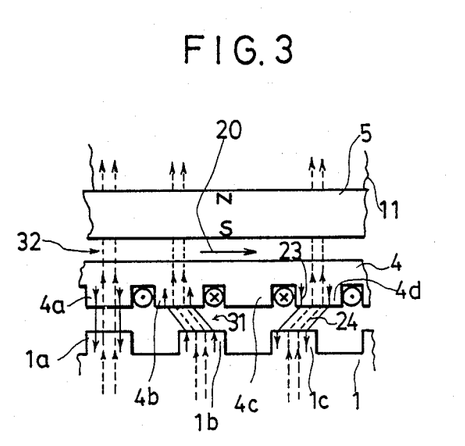
FIG. 3 is a schematic illustration for explaining the third embodiment according to the present invention.

Referring to FIG. 3, there is shown a linear motor wherein a third embodiment according to the present invention is embodied.

A series of magnetic poles 1a, 1b, 1c, . . . , is arranged on a magnetic stationary member 1 at a regular pitch and energized as electric current is applied to electric coil, not shown in the figure.

Another magnetic stationary member 11 is magnetically and mechanically connected to the former magnetic stationary member 1 through means not shown. The N-polarity magnetic face of a permanent magnet 5 is tightly fixed to the magnetic stationary member 11.

A series of magnetic poles 4a, 4b, 4c, 4d, . . . is arranged on a magnetic movable member 4 at a predetermined pitch different from that of the magnetic poles 1a, 1b, 1c . . . . These magnetic poles 4a, 4b, 4c, 4d, . . . face to the magnetic poles 1a, 1b, 1c through a first gap 31 so as to form a magnetic circuit. The permanent magnet 5 applies magnetomotive force to this magnetic circuit.

On the other hand, the magnetic movable member 4 faces the S-polarity surface of the permanent magnet 5 through a second gap 32.

The magnetic poles constituting this magnetic circuit are selectively classified into required groups. Electric coils not shown are so arranged that any one of the magnetic poles belonging to the group is energized in the same direction of the magnetomotive force generated by the permanent magnet 5 and the other magnetic poles of the group are energized in the counter direction of the magnetomotive force. In other words, when the magnetic poles 1a, 1b, 1c, ... Of the magnetic stationary member 1 and the magnetic poles 4a, 4b, 4c, 4d, ... Of the magnetic movable member 4 are located in the position shown in the figure, the magnetic pole 1b is only energized in the same direction of the second magnetic flux 24 generated by the permanent magnet 5 and the other poles 1a, 1c, are energized in the counter direction of the second magnetic flux 24 so as to generate the first magnetic flux 23 represented by the solid line arrow. This first magnetic flux 23 interacts with the second magnetic flux 24 represented by the dotted line arrow generated by the permanent magnet 5, so that the magnetic movable member 4 is subjected to the urging force in the direction represented by the arrow 20 and thus the movable member 4 shifts ¼ pitch and stops in the new stable position where the urging force is not applied.

Succeedingly, when one of the magnetic poles 1a, 1b, 1c ... is only energized in the same direction of the second magnetic flux 24 generated by the permanent magnet 5 and the other poles are energized in the counter direction of that, the magnetic movable member 4 shifts to succeeding stable positions according to this energization.

As mentioned above, all the magnetic poles 1a, 1b, 1c, ... Of the stationary member of this embodiment are energized simultaneously when electric current is applied. This is distinguished from the conventional device.

Although the permanent magnet 5 is disposed at the magnetic stationary member 1,11 in the above mentioned all embodiments it may be also arranged on the magnetic movable member 4.

Referring to FIGS. 4(a), (b), there is shown a rotary type step motor wherein the fourth embodiment according to the present invention is embodied.

Figure 4:
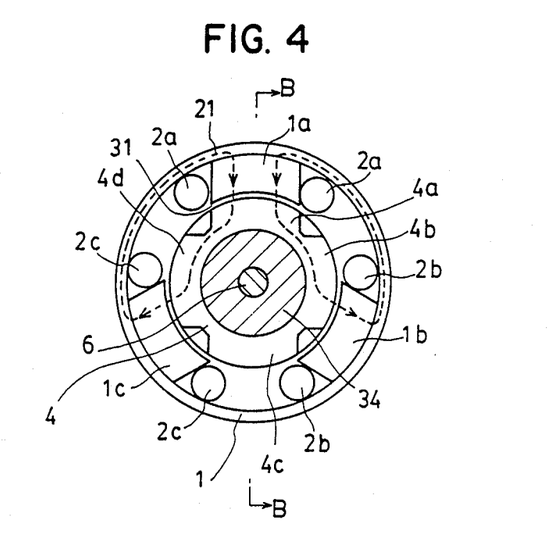

FIG. 4 (a) is a sectional view taken along the line B—B in FIG. 4(b), and FIG. 4(b) is also a sectional view taken along the line A—A in FIG. 4(a), respectively.

A plurality of magnetic poles 1a, 1b, 1c, is arranged on the inner surface of a cylindrical magnetic stationary member 1 at a predetermined regular pitch. On the other hand, a plurality of magnetic poles 4a, 4b, 4c, 4d is arranged on the circumferential edge of a magnetic movable member 4 at a predetermined pitch different from the former pitch of the poles 1a, 1b, 1c. The magnetic poles 1a, 1b, 1c face to the magnetic poles 4a, 4b, 4c, 4d through a first gap 31 so as to form a magnetic circuit.

The N-polarity surface of a permanent magnet 5 is tightly fixed to a magnetic bracket 3 and the S-polarity surface faces to the magnetic movable member 4 through a second gap 32 so as to magnetize in the direction of the axis of a shaft 6. According to this arrangement, the permanent magnet 5 applies the second flux 22 to the first flux 21 generated by the electric coils 2a, 2b, 2c.

The magnetic poles of the stationary member constituting the magnetic circuit are selectively classified into required groups. Electric coils 2a, 2b, 2c are arranged to energize the magnetic poles 1a, 1b, 1c respectively and so arranged that the first flux 21 of any one of the magnetic poles belonging to the group is energized in the same direction of the second flux 22 generated by the permanent magnet 5. And the second flux 21 of the other magnetic poles of the groups are energized in the counter direction of the second flux 22.

A magnetic bracket 3 is connected to the magnetic stationary member 1 and pivotably supports the magnetic movable member 4 as a rotary member in combination with a non-magnetic member 34, a shaft 6 and a bearing 7.

This embodiment operates in the same manner as the embodiment as shown in FIG. 1.

UTILIZING FIELD IN INDUSTRIAL FIELD

The present invention is adapted to maintain various mechanical stable states, to freely control for switching between each mechanical stable positions in a electric manner, or to a positioning mechanism such as a valve rod, XY-plotter or the like.

What we claim is:

1. A step motor comprising magnetic stationary members (1,11) containing a plurality of series of magnetic poles (1a, 1b, ... 11a, 11b, ... ) arranged at a predetermined regular pitch; a magnetic movable member (4) containing a plurality of series of magnetic poles (4a, 4b ..., 41a, 41b, ... ) arranged at a predetermined regular pitch different from the magnetic pole series (1a, 1b, ... 11a, 11b, ... ), each magnet pole (4b, ... 41a, 41b,) having a magnetic surface opposing the magnetic surface of each of the pole series (1a, 1b, ... 11a, 11b, ... ) through a gap; electric coils (2a, 2b, ... ) wound so as to energize the magnetic pole series and generating a first flux; a permanent magnet (5) containing a first magnetic pole face fixed to the magnetic stationary member (1,11) and a second magnetic pole face which is arranged opposite the magnetic movable member (4) through a gap and generating a second flux; and means (6, 7) for mechanically displacing the magnetic movable member (4) with respect to the magnetic stationary members (1,11), characterized in that said electric coils (2a, 2b, ... ) are so wound as to energize one magnetic pole, which belongs to one of groups each which includes a predetermined number of poles classified from the magnetic poles (1a, 1b, ... 4a, 4b, ... 41a, 41b, ... ) said electric coils (2a, 2b, ... ) generate the first flux in the same direction of the second flux, said electric coils (2a, 2b, ... ) energize the other magnetic poles and generate the first flux in the counter direction of the second flux and the all electric coils (2a, 2b, ... ) energize said poles simultaneously and the permanent magnet (5) is so arranged that the first flux generated by the coils do not flow through the permanent magnet (5).

* * * * *

UNITED STATES PATENT AND TRADEMARK OFFICE
CERTIFICATE OF CORRECTION

PATENT NO. : 4,857,782

DATED : Aug. 15, 1989

INVENTOR(S) : Uetsuhara Tokio et al

It is certified that error appears in the above-identified patent and that said Letters Patent is hereby corrected as shown below:

| Col. | Line | |
|---|---|---|
| 1 | 40 | "Of" should be --of-- |
| 1 | 41 | " " " " " " " " " " |
| 4 | 50 | "Figs. 1(a),(b),(c),(d)" should start as a new paragraph |
| 5 | 55 | "Also, it is etc. should start as a new paragraph |
| 6 | 3 | "Of" should be --of-- |
| 7 | 14 | " " " " " " " " " " |
| 7 | 15 | " " " " " " " " " " |
| 7 | 39 | " " " " " " " " " " |
| 8 | Claim 1 55&56 | "4a, 4b, ...41a, 41b.. )" should be --4a, 4b, ...41a, 41b)-- |

Signed and Sealed this

Third Day of April, 1990

Attest:

HARRY F. MANBECK, JR.

Attesting Officer    Commissioner of Patents and Trademarks